United States Patent [19]

Lin

[11] Patent Number: 4,653,816

[45] Date of Patent: Mar. 31, 1987

[54] ANTI-LOCK BRAKE CONTROL SYSTEM

[75] Inventor: William C. Lin, Troy, Mich.

[73] Assignee: General Motors Corporation, Detroit, Mich.

[21] Appl. No.: 787,440

[22] Filed: Oct. 15, 1985

[51] Int. Cl.$^4$ ................................................ B60T 8/66
[52] U.S. Cl. .................................... 303/106; 303/109; 303/97; 364/426
[58] Field of Search ............... 303/92, 93, 100, 105, 303/106, 109, 104, 97; 188/181 A, 18 R, 181 C; 364/426

[56] References Cited

U.S. PATENT DOCUMENTS

| | | | |
|---|---|---|---|
| 3,494,671 | 2/1970 | Slavin et al. | 303/106 |
| 3,547,500 | 12/1970 | Riordan | 303/104 |
| 3,586,387 | 6/1971 | Riordan | 303/109 |
| 3,698,772 | 10/1972 | Nixon | 303/97 |
| 3,701,568 | 10/1972 | Lewis et al. | 303/109 |
| 3,790,225 | 2/1974 | Wehde | 303/113 |
| 3,850,480 | 11/1974 | Atkins | 188/181 A |
| 3,871,715 | 3/1975 | Hikida et al. | 303/109 |
| 4,077,675 | 3/1978 | Leiber et al. | 303/106 |

Primary Examiner—John W. Caldwell, Sr.
Assistant Examiner—Alvin Oberley
Attorney, Agent, or Firm—Howard N. Conkey

[57] ABSTRACT

A wheel lock control system wherein the critical wheel slip producing the maximum braking force between the road surface and the tire is identified and the brake pressure is modulated continuously when an incipient wheel lockup is sensed to maintain the wheel slip value at the critical wheel slip value.

3 Claims, 6 Drawing Figures

IMPENDING WHEEL LOCK FUNCTION

ANTI-LOCK BRAKE CONTROL SYSTEM

BACKGROUND OF THE INVENTION

This invention relates to an anti-lock control system for vehicle brakes.

When the brakes of a vehicle are applied, a braking force between the tire and the road surface is generated that is dependent upon various parameters including the road surface condition and the amount of slip between the tire and the road surface. For a given road surface, the brake force between the tire and the road surface increases with increasing slip values to a peak force occurring at a critical slip value. As the value of slip increases beyond the critical slip value, the braking force between the tire and the road surface decreases. Stable braking results when the slip value is equal to or less than the critical slip value. However, when the slip value becomes greater than the critical slip value, braking becomes unstable resulting in sudden wheel lockup thereby reducing vehicle stopping distance and a deterioration in the lateral stability of the vehicle.

Numerous wheel lock control systems have been proposed to prevent the wheels from locking during a braking maneuver. Typically, these systems control the applied brake pressure to prevent the wheels from locking by releasing the applied brake pressure when an incipient lockup condition is sensed (which may be represented by the wheel deceleration exceeding a critical value) and reapplying the brake pressure when the wheel has recovered from the incipient wheel lock condition (which may be represented by the wheel acceleration during wheel speed recovery while the brake pressure is released decreasing to a value representing the wheel approaching a hypothetical zero-slip wheel speed. This type of system results in rapid cycling of the brake pressure and the wheel slip value around the critical slip value to maintain a stable braking operation.

SUMMARY OF THE INVENTION

As opposed to the foregoing systems for preventing wheel lockup, the subject invention is directed toward a system wherein the critical slip value producing the maximum braking force between the road surface and the tire is identified and the brake pressure is modulated continuously when an incipient wheel lock condition is sensed so as to maintain the actual wheel slip value at the identified critical slip value thereby preventing wheel lockup and providing substantially the maximum possible braking effort between the tire and the road surface.

In general, the subject wheel lock control system continuously monitors vehicle deceleration which is utilized during braking to determine the vehicle velocity in the form of the speed of a hypothetical free-spinning wheel having zero slip. The slip of the wheel during braking is determined by comparing the actual wheel speed to the speed of the hypothetical free-spinning wheel. The wheel slip value determined is compared with a critical wheel slip value that results in the maximum braking force between the wheel and the road surface. The difference between the actual wheel slip value and the critical wheel slip value is utilized to continuously modulate the wheel brake pressure to maintain the slip at the critical value producing the maximum wheel-road surface braking force.

In accord with this invention, the value of the critical slip value is determined during each brake application by continuously monitoring both the vehicle deceleration and the actual wheel slip value. The critical wheel slip value is determined to be the slip value that exists at the maximum sensed value of vehicle deceleration. When the brakes are applied, the wheel slip increases and the vehicle begins to decelerate. As the magnitude of the deceleration increases, the measured slip value corresponding thereto is stored. The maximum vehicle deceleration will occur when the wheel slip becomes equal to the critical value corresponding to the peak brake force between the wheel and the road surface. Therefore, the slip value stored at that vehicle deceleration becomes the reference for controlling vehicle slip. The brake pressure is continuously modulated to limit the slip to the stored critical slip value to achieve optimum braking conditions.

DESCRIPTION OF THE DRAWINGS

The invention may be best understood by reference to the following description of a preferred embodiment and the drawings in which.

DESCRIPTION OF THE PREFERRED EMBODIMENT

A wheel under the influence of braking has two major torques acting on it: brake torque and tire torque. The brake torque arises from the application of brake pressure through the brake mechanism and the tire torque is generated by the friction of the tire-road interface as wheel slip occurs. The tire torque is a non-linear function of the magnitude of slip between the wheel and the road surface during braking and is dependent upon the road surface condition.

Figure 1:
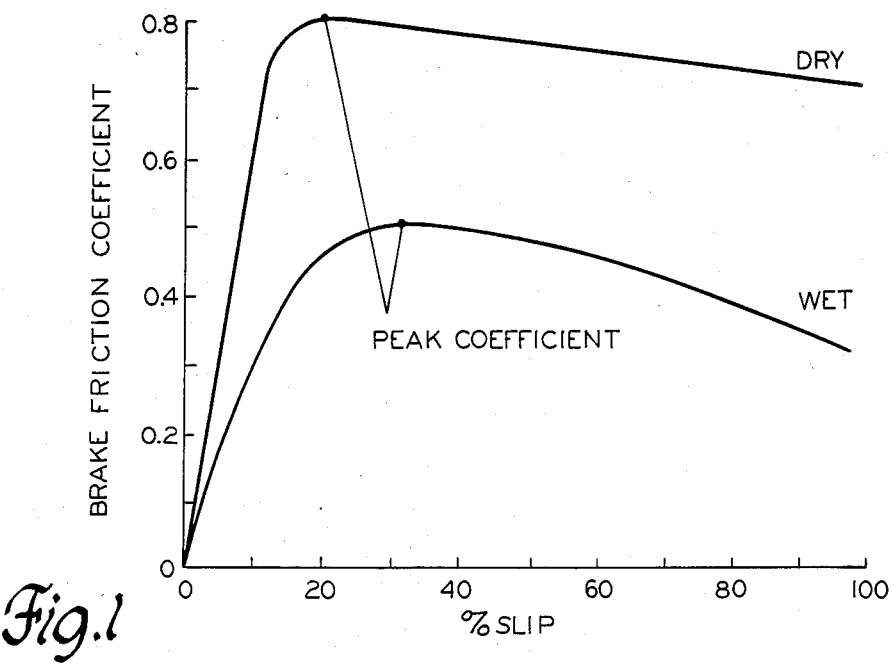
FIG. 1 is a diagram illustrating the brake friction coefficient between a tire and a road surface as a function of the percentage slip between the tire and the road surface for two road surface conditions.

FIG. 1 illustrates the brake friction coefficient between a tire and road surface as a function of the percentage wheel slip for two road surface conditions. For a given road surface, it can be seen that as wheel slip is increased in response to increased brake torque, the brake friction coefficient and therefore the tire torque increases until a critical or optimum slip value at which the brake friction coefficient and the tire torque is a maximum. A further increase in wheel slip results in a decrease in the brake friction coefficient and the tire torque.

The maximum tire torque resulting in a maximum braking effort for a given road surface is achieved when the brake torque produces the critical wheel slip value at the peak value of the brake friction coefficient. When the braking effort results in wheel slip exceeding the critical slip value, the braking operation becomes unstable and may result in a sudden wheel lockup. Since the magnitude of vehicle deceleration is directly proportional to the magnitude of the brake friction coefficient, maximum vehicle deceleration will occur when the wheel slip is at the critical value at which the brake friction coefficient is a maximum. Therefore, maximum braking effort is achieved producing peak vehicle deceleration when the slip value is at the critical slip value.

In general, the brake control system incorporating the principles of this invention stores the wheel slip value existing at the time the maximum vehicle deceleration is sensed. When the actual slip value exceeds this stored value, the vehicle brake pressure is modulated to limit the slip to the stored value to prevent wheel lockup and to produce the maximum possible braking effort.

Figure 2:
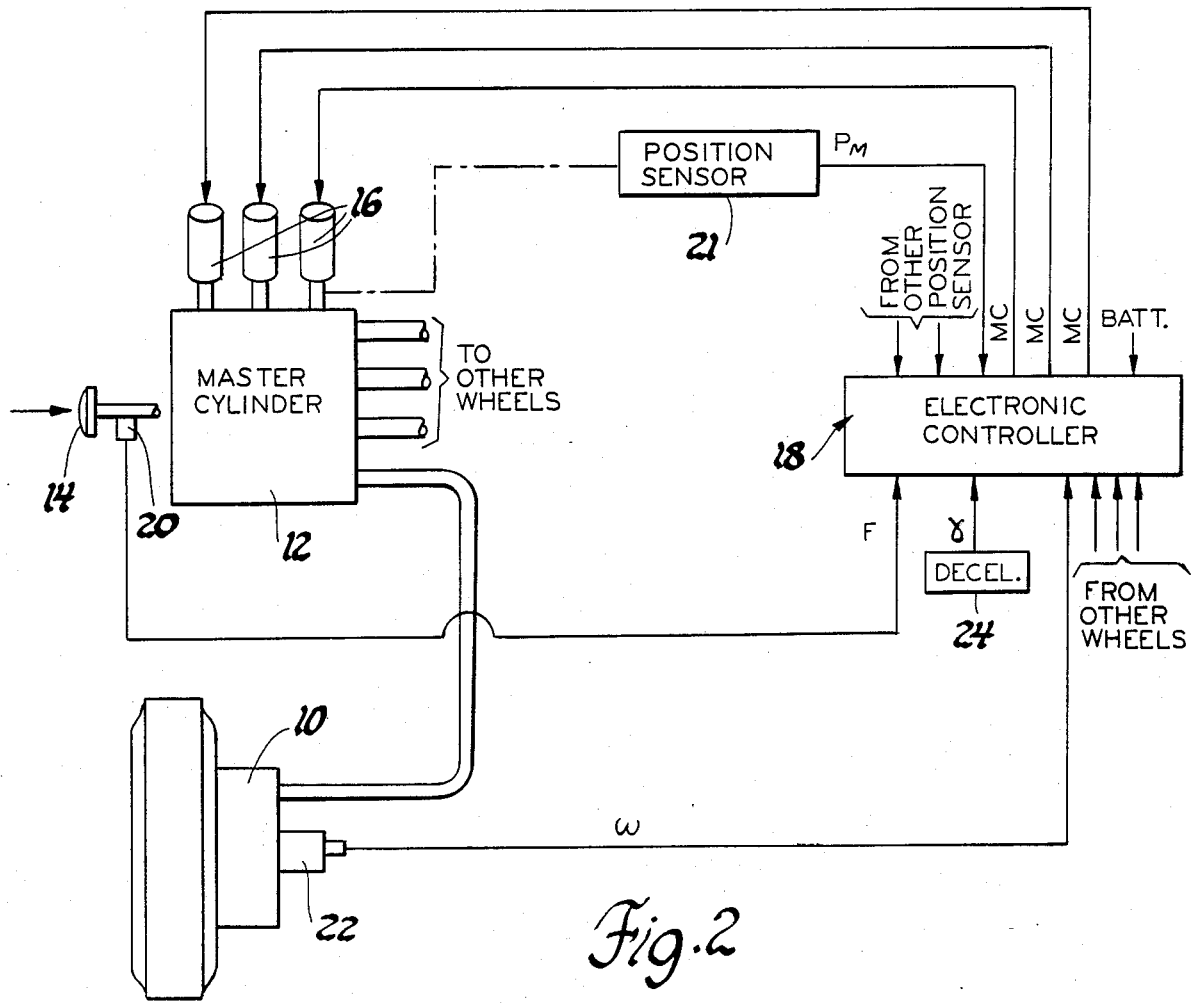
FIG. 2 is a general diagram of the braking system for controlling the brakes in accord with the principles of this invention.

A general overview of the wheel lock control system of this invention is illustrated in FIG. 2. Standard wheel brakes 10 (one of four shown) are actuated by controlled hydraulic pressure from a master cylinder 12. The hydraulic pressure output of the master cylinder 12 to the four wheels of the vehicle is controlled directly by the vehicle brake pedal 14 and by electric motors 16. An electronic controller 18 provides a respective motor control signal MC to the motors 16 in response to the output of a brake pedal force sensor 20 and a position feedback signal $P_M$ from position sensors 21 monitoring the rotational angle of the output shafts of the motors 16 to provide power assisted braking. The sensors 21 may each take the form of a potentiometer providing a voltage indicating motor position. The electronic controller 18 also responds to a wheel speed sensor 22 from each wheel providing a wheel speed signal $\omega$ and a chassis decelerometer 24 providing a vehicle deceleration signal $\alpha$ to determine wheel slip for each wheel. When excessive slip of one of the wheels is detected, the rotational output of the corresponding motor 16 is continuously controlled to limit the slip of the wheel to the critical point where the adhesion between the tire and road surface is a maximum.

The master cylinder 12 may take the form of the master cylinder described in the U.S. patent application Ser. No. 697,743 filed Feb. 4, 1985 and assigned to the assignee of this invention. In general, the master cylinder 12 provides a modulated pressure to each of the wheels in response to the combined inputs from the brake pedal 14 and the electric motors 16.

In the present embodiment, the brakes of the rear wheels are controlled by a common motor 16 and the front wheels are independently controlled by individual motors 16. The electronic controller 18 responds to the various inputs to provide individual motor control signals MC to each of the motors 16 for providing the respective controlled hydraulic pressure outputs of the master cylinder 12. The control of a single front wheel brake will be described to illustrate the present invention, it being understood that similar controls to the remaining brakes are provided in order to achieve the principles of the present invention. In the case of the rear wheels, the controller 18 may select the lowest speed of the two rear wheels for controlling slip.

Figure 3:
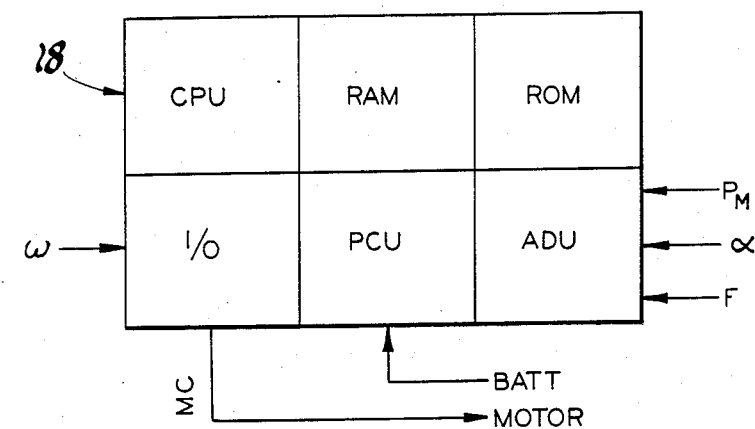
FIG. 3 is a diagram of the electronic controller of FIG. 2.

As illustrated in FIG. 3, the electronic controller 18 takes the form of a digital computer. The digital computer is standard in form and includes a central processing unit (CPU) which executes an operating program permanently stored in a read-only memory (ROM) which also stores tables and constants utilized in controlling the hydraulic pressure input to the brake 10. Contained within the CPU are conventional counters, registers, accumulators, flag flip flops, etc. along with a clock which provides a high frequency clock signal. The electronic controller also includes a random access memory (RAM) into which data may be temporarily stored and from which data may be read at various address locations determined in accord with the program stored in the ROM. A power control unit (PCU) receives battery voltage V+ and provides regulated power to the various operating circuits in the electronic controller 18. The controller 18 also includes an input/output circuit (I/O) that in turn includes an output counter section. The output counter section is controlled by the CPU to provide a duty cycle modulated motor control signal MC to the torque motor 16 for establishing the hydraulic brake pressure input to the brake 10. It is understood that additional signals are provided to the remaining two motors 16 for controlling the hydraulic brake pressures to the remaining brakes.

The I/O also includes an input counter section which receives a pulse output from the wheel speed sensor 22 having a frequency representing wheel speed. Wheel speed is then determined by counting clock pulses between each wheel speed signal.

The electronic controller 18 also includes an analog-to-digital converter (ADU) which provides for the measurement of analog signals. The analog signals representing conditions upon which the hydraulic brake pressure to the brake 10 is based are supplied to the ADU. In the present embodiment, those signals include the motor position signal $P_M$ from the position sensor 21, the output signal of the brake pedal force sensor 20 providing a measure of the force F applied to the pedal 14 and the vehicle deceleration signal $\alpha$ from the chassis decelerometer 24. The analog signals are sampled and converted under control of the CPU and stored in ROM designated RAM memory locations.

Figure 4:
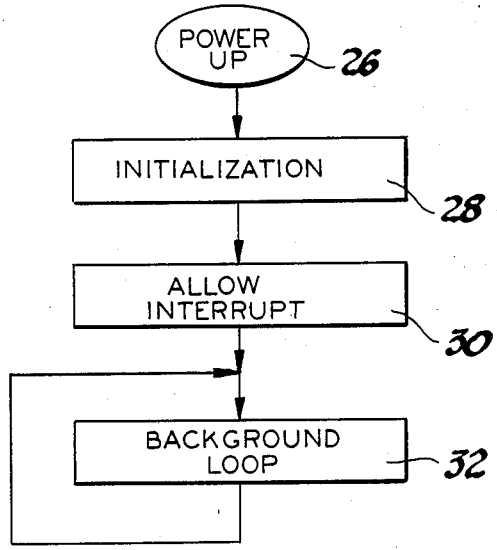
FIGS. 4 and 5 are diagrams illustrating the operation of the electronic controller of FIG. 3 in controlling the wheel brake pressure.
Figure 5:
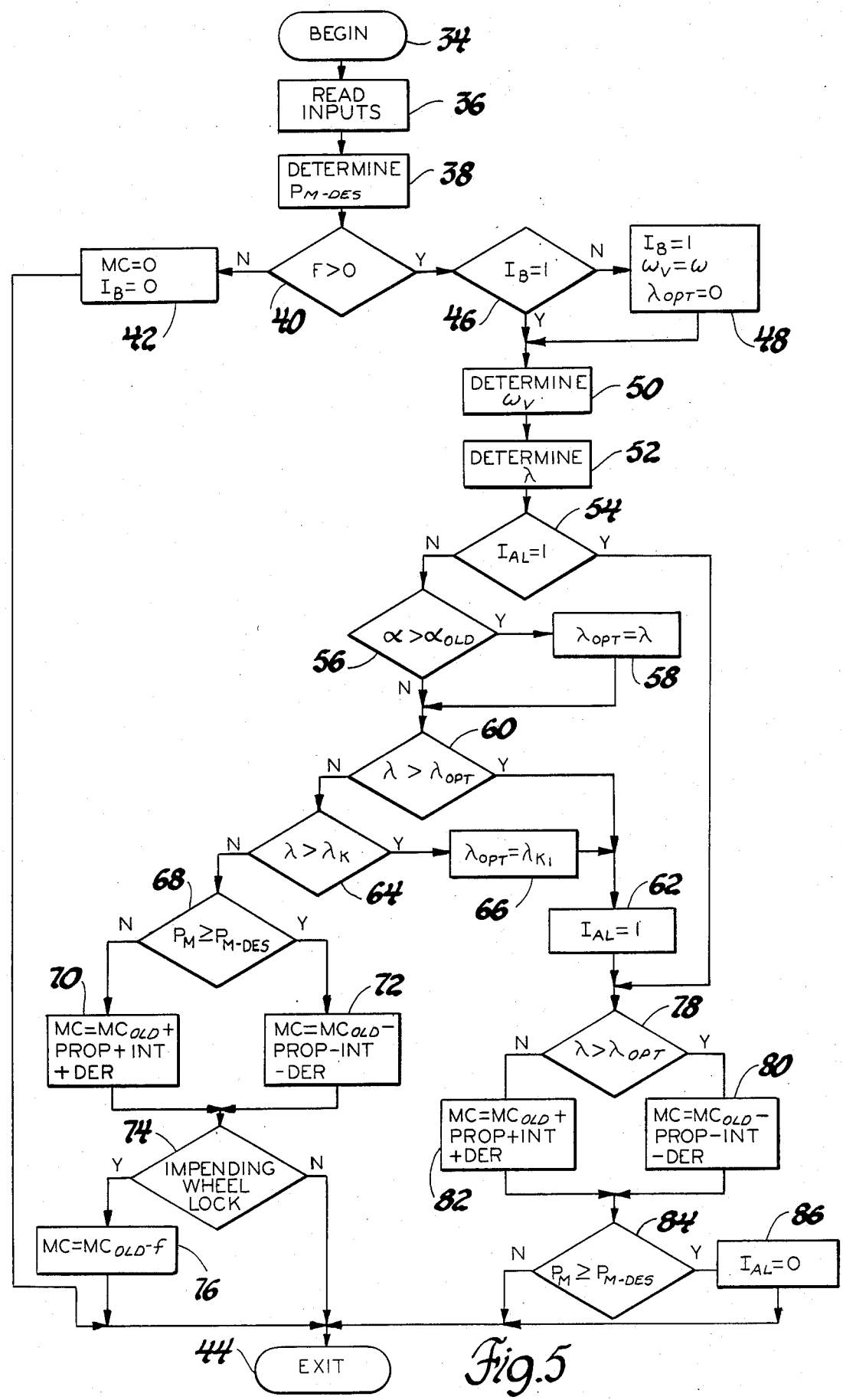

The operation of the electronic controller 18 in controlling the hydraulic brake pressure to the brake 10 in accord with the principles of this invention is illustrated in FIGS. 4 and 5. Referring first to FIG. 4, when power is first applied to the system such as when the vehicle ignition switch is rotated to its "on" position, the computer program is initiated at point 26 and then proceeds to a step 28 where the computer provides for system initialization. For example, at this step initial values stored in the ROM are entered into ROM designated RAM memory locations and counters, flags and timers are initialized. After the initialization step 28, the program proceeds to a step 30 where the program allows interrupts to occur such as by resetting the interrupt mask bit in the CPU condition code register. After step 30, the program shifts to a background loop 32 which is continuously repeated. This loop may include, for example, diagnostic routines. An interrupt is provided by the CPU at 5 millisecond intervals during which the routine for establishing the hydraulic brake pressure to the brake 10 is executed.

Referring to FIG. 5, the routine for controlling the hydraulic pressure applied to the brake 10 is begun at step 34 and proceeds to a step 36 where the value of the vehicle deceleration read during the prior execution of step 36 is saved and the new values of the motor position signal $P_M$, the brake pedal force F, vehicle deceleration $\alpha$ and wheel speed $\omega$ are read and stored in RAM memory locations. Next at step 38, a desired motor position $P_{M\text{-}DES}$ is determined as a function of the foot pedal force F and may be made linearly proportioned thereto.

At step 40, the program determines whether or not the foot pedal force F is greater than zero. If the foot pedal force is zero, i.e., the brake is not activated, the program proceeds to a step 42 where the duty cycle of the motor command signal MC is set to zero and a brake flag $I_B$ is reset. The program then exits the routine at point 44.

If the brake pedal force F is greater than zero indicating application of the brakes by the vehicle operator, the program proceeds from step 40 to a step 46 where the status of the brake flag $I_B$ is checked. If the brake flag is reset indicating the first time the routine has been executed since application of the brakes, the program proceeds to a step 48 where the brake flag $I_B$ is set, vehicle speed represented by a hypothetical zero-slip wheel speed $\omega_V$ is set equal to the measured wheel speed $\omega$ and the initial value of the critical wheel slip value $\lambda_{opt}$ is set to zero.

From step 48 (or step 46 during subsequent executions of the routine of FIG. 5 during the same braking maneuver resulting from the flag $I_B$ being set), the program proceeds to a step 50, where the hypothetical zero-slip wheel speed is determined from the integration of the output of the vehicle chassis decelerometer 24. This determination is based on the known system constants including the radius of the vehicle wheel. From step 50, the program proceeds to a step 52 where the value of wheel slip $\lambda$ is determined by the formula $\lambda = (\omega_V - \omega)/\omega_V$.

From step 52, the program checks the status of an anti-lock flag $I_{AL}$ to determine if the brake pressure is being controlled in response to a sensed incipient wheel lockup. If set, it represents that the electronic controller 18 is operating in an anti-lock control mode. If reset, the program must determine if it should enter into an anti-lock mode. The program does this by first estimating the critical wheel slip value above which unstable braking may occur. The estimation method of this invention utilizes the detection of the maximum vehicle deceleration to determine the critical slip value. For each road surface characteristic, there exists a critical wheel slip value resulting in the maximum braking effort. At this point, the vehicle experiences the maximum deceleration. At both above and below this critical slip value, the deceleration will be less than the maximum value. An important characteristic of the braking system is that when the wheel slip is smaller than the critical value, the vehicle braking dynamics are stable. On the other hand, when the wheel slip is greater than the critical value, the wheel dynamics become unstable and wheel lockup will occur if the anti-lock braking control is not implemented.

To accomplish the foregoing, the program proceeds from the step 54 to the step 56 where the present measured value of vehicle deceleration is compared with the prior vehicle deceleration saved at step 36. If the deceleration is greater than the prior stored value of deceleration, the program proceeds to a step 58 where the value of wheel slip determined at step 52 is stored as the new estimation of the critical slip value $\lambda_{opt}$. From step 58 or from step 56 if vehicle deceleration is not increasing, the program proceeds to a step 60 where the wheel slip determined at step 52 is compared with the stored estimated critical slip value. If the wheel slip value exceeds the critical slip value indicating an incipient wheel-lockup condition, the program proceeds to a step 62 where the anti-lock brake control flag $I_{AL}$ is set.

It is noted that in the early stage of brake application, wheel slip is usually increasing and so is vehicle deceleration. In this case, the wheel slip determined at step 52 will be recorded at step 58 at each execution of the routine of FIG. 5. However, at step 60 the slip value determined at step 52 will not exceed the estimated critical value (which is itself) stored at step 58. Only when the actual critical slip value is exceeded does vehicle deceleration decrease with increasing slip. When this condition exists, the step 58 will be bypassed and the previously stored estimated critical slip value is (A) equal to the actual critical slip value for the existing road surface condition and (B) less than the wheel slip determined at step 52.

Ideally, the foregoing decribed steps provide for the sensing of an incipient wheel lock condition which occurs when the wheel slip exceeds the critical slip value. However, interferences and noises from other vehicle subsystems could result in an erroneous indication of a stable braking condition even though the critical slip value has been exceeded. To ensure wheel lock control under these conditions, the program sets the system for operation in the wheel lock control mode even though step 60 indicates the critical slip value is not exceeded if the actual wheel slip exceeds a calibration constant $\lambda_K$ which is greater than the largest anticipated slip condition for stable braking under all road surface conditions.

The foregoing is accomplished beginning at step 64 when step 60 determines that the wheel slip value determined at step 52 is less than the estimated critical slip value. At step 64, the slip value calculated at step 52 is compared with the calibration constant $\lambda_K$. If the slip value exceeds this value indicating an incipient lockup condition, the program proceeds to a step 66 where the critical slip value is set to a value $\lambda_{K1}$ that is less than the calibration constant $\lambda_K$. Thereafter the program proceeds to the step 62 where the anti-lock brake control flag $I_{AL}$ is set to enable the routine to execute the wheel lock control mode.

Assuming at step 64 the slip value calculated at step 52 is less than the value $\lambda_K$, anti-lock control of the braking system is not required and the program proceeds to provide power assist for the braking system. This is accomplished beginning at step 68 by comparing the position $P_M$ of the output shaft of the motor 16 with the desired motor position determined at step 38 and which is proportional to the vehicle operator applied force F on the brake pedal 14. If the motor position is less than the desired position, the program proceeds to a step 70 where the motor command signal in the form of a duty cycle modulated signal is increased in accord with proportional integral and derivative terms. If at step 68 it is determined that the motor position is greater than the desired position, the program proceeds to a step 72 where the motor command signal provided to the motor 16 is decreased in accord with proportional integral and derivative terms.

Figure 6:
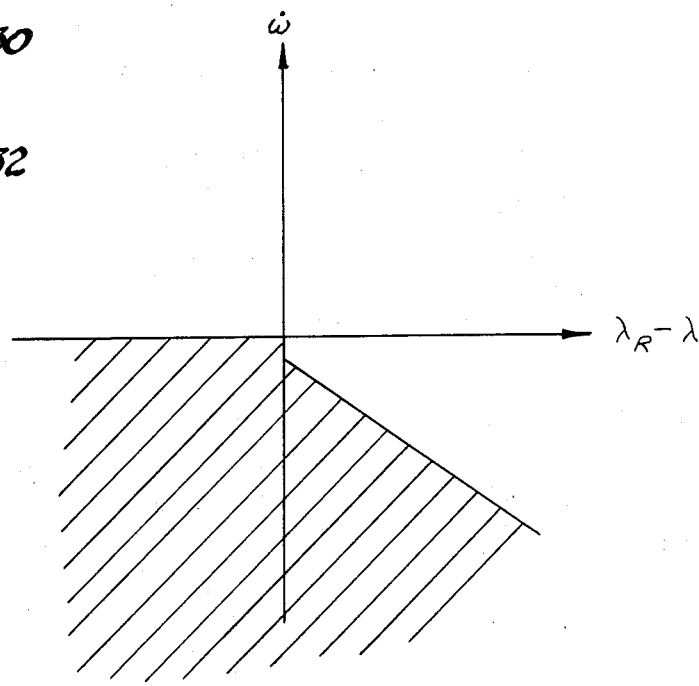
FIG. 6 is a diagram illustrating the function for anticipating an impending wheel lock condition.

Typically, the transition between normal power assist and the wheel lock control mode of brake control systems may result in initial large wheel speed transients. In accord with this invention, the onset of an impending wheel lock condition is sensed even before it may be detected via steps 54 through 66. This is established by a predetermined function of vehicle deceleration and wheel slip as illustrated in FIG. 6. The shaded portion of FIG. 6 represents the combination of wheel deceleration and wheel slip relative to a constant slip value $\omega_R$ that anticipates an impending wheel lockup condition. Therefore in accord with this invention, if the conditions of wheel slip and vehicle deceleration fall within the shaded area of FIG. 6, the motor command signal is reduced to reduce the braking force in anticipation of the impending wheel lock condition. This is accomplished beginning at step 74 which is executed after step 70 or 72. At step 74, the program determines whether or not the conditions of wheel slip and vehicle deceleration fall within the shaded area of FIG. 6. If not, the program exits the routine at step 44. However, if step 74 anticipates an impending wheel lock condition, the program proceeds to a step 76 where the motor command signal is reduced by a predetermined function f. The program then exits the routine at step 44.

When the anti-lock flag $I_{AL}$ is set at step 62 following step 60 or 66, the routine is set to a wheel lock control mode and the controller bypasses the optimal wheel-slip estimation beginning at step 56 and the power assist mode beginning at step 68. The wheel lock control mode steps are entered from step 62 when an incipient wheel lockup is first detected and thereafter from step 54.

From step 62 or step 54 the program proceeds to a step 78 where the wheel slip determined at step 52 is compared to the estimated critical wheel slip value last updated at step 58. As previously indicated, this critical wheel slip value is the wheel slip resulting in the maximum vehicle deceleration and represents the wheel slip producing the maximum possible braking effort for the particular road surface condition.

If the actual slip value determined at step 52 is greater than the estimated critical slip value, the program proceeds to a step 80 where the motor command signal is decreased in accord with proportional, integral and derivative terms to reduce the braking force and the resulting slip toward the critical slip value. If at step 78 it is determined that the actual wheel slip value is less than the critical value, the program proceeds to a step 82 where the motor command signal is increased in accord with proportional, integral and derivative terms to increase the braking force and the resulting slip toward the critical slip value.

If at any time during the wheel lock control mode of operation via steps 78, 80 and 82 the desired motor position $P_{M-DES}$ determined at step 38 resulting from the operator applied force F to the brake pedal 14 becomes less than the actual motor position resulting from the operation of steps 80 or 82, the wheel lock control mode is terminated and the routine reverts to the power assist mode previously described. This is accomplished by detecting this condition at step 84 and then by resetting the anti-lock brake control flag $I_{AL}$ at step 86. If, however, the desired pressure established by the vehicle operator at step 38 is greater than the motor position established through operation of the wheel lock control mode, the program bypasses the step 86 and exits the routine at step 44 directly from step 84.

The foregoing description of a preferred embodiment for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A wheel lock control system for a vehicle having a wheel and a system for applying vehicle operator commanded braking forces to the wheel, the system comprising:
    means for sensing the deceleration of the vehicle;
    means for determining the amount of wheel slip;
    means for (A) detecting the peak value of the sensed deceleration of the vehicle and (B) storing the determined amount of wheel slip corresponding in time to the detected peak value of the sensed deceleration of the vehicle;
    means for comparing the amount of wheel slip to the stored amount of wheel slip; and
    means for decreasing the braking forces applied to the wheel when the determined amount of wheel slip exceeds the stored amount of wheel slip so as to cause substantial correspondence between the determined and stored wheel slip values, whereby the wheel slip is limited to the value producing substantially the peak vehicle deceleration.

2. A wheel lock control system for a vehicle having a wheel and a braking system for applying vehicle operator commanded braking forces to the wheel to provide wheel braking, the system comprising:
    an accelerometer for sensing vehicle deceleration;
    a speed sensor for sensing wheel speed;
    means responsive to the sensed vehicle deceleration and the sensed wheel speed for determining the hypothetical wheel speed of an unbraked wheel of the vehicle;
    means for determining the wheel slip value, the wheel slip value being the difference between the sensed and hypothetical wheel speeds;
    means for sensing the peak value of the sensed vehicle deceleration during wheel braking;
    means for storing the wheel slip value corresponding in time to the detected peak value of the sensed vehicle deceleration;
    means for comparing the wheel slip value and the stored wheel slip value; and
    means for decreasing the braking forces applied to the wheel when the wheel slip value exceeds the stored wheel slip value so as to cause substantial correspondence between the wheel slip value and the stored wheel slip value, whereby the wheel slip is limited to the value producing substantially the peak vehicle deceleration.

3. A wheel lock control system for a vehicle having a wheel and a braking system for applying braking forces to the wheel, the system comprising:
    means for providing a vehicle operator brake force command signal;
    power assist means for adjusting the brake force to a power assist value in accord with the vehicle operator brake force command signal;
    an accelerometer for sensing vehicle deceleration;
    a speed sensor for sensing wheel speed;
    means responsive to the sensed vehicle deceleration and the sensed wheel speed for determining the hypothetical wheel speed of an unbraked wheel of the vehicle;
    means for determining the actual wheel slip value that is equal to the difference between the sensed and hypothetical wheel speeds;
    means for sensing the peak value of the sensed vehicle deceleration during wheel braking;

means for storing the actual wheel slip value corresponding in time to the detected peak value of the sensed vehicle deceleration;

slip control means for continuously adjusting the brake force to a slip control value to cause correspondence between the actual wheel slip value and the stored wheel slip value; and means for (A) disabling the power assist means and enabling the slip control means when the actual wheel slip value becomes greater than the stored wheel slip value thereby representing an incipient wheel lockup condition and (B) disabling the slip control means and enabling the power assist means when the brake force slip control value becomes greater than the power assist value corresponding to the vehicle operator brake force command signal.

* * * * *